United States Patent Office 3,803,156
Patented Apr. 9, 1974

3,803,156
PROCESS FOR THE PREPARATION OF
PYRIDINECARBOXYLIC ACID
Ryoichi Yokoyama, Mihara, and Katsumi Sawada, Hongomachi, Japan, assignors to Teijin Chemicals Limited, Tokyo, Japan
No Drawing. Original application July 28, 1969, Ser. No. 845,568, now abandoned. Divided and this application Apr. 14, 1972, Ser. No. 244,258
Int. Cl. C07d 31/36
U.S. Cl. 260—295 R                                     1 Claim

ABSTRACT OF THE DISCLOSURE

A process for the preparation of a compound of the formula

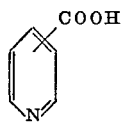

in which the carboxyl group is linked at the 3- or 4-position on the pyridine ring, which comprises contacting a compound of the formula

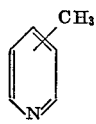

in which the methyl group is linked at the 3- or 4-position on the pyridine ring, with a solid oxidation catalyst containing a vanadium compound bonded with oxygen, together with a molecular oxygen-containing gas, in the vapor phase, characterized in that at least 30 times the weight of the starting compound of steam is introduced into the reaction system.

---

This is a division of application Ser. No. 845,568, filed July 28, 1969, now abandoned.

This invention relates to a process for the preparation of pyridinecarboxylic acid. More particularly, the invention relates to a process of contacting β or γ-picoline and molecular oxygen with a solid oxidation catalyst containing a vanadium compound bonded with oxygen, in the presence of a specific amount of steam, in the vapor phase, to thereby produce the corresponding pyridinecarboxylic acid.

Pyridinecarboxylic acids, such as nicotinic acid and isonicotinic acid, are valuable as medicines or medical intermediates. Conventionally, those pyridinecarboxylic acids are prepared by vapor phase oxidation of corresponding picolines using an oxidation agent such as nitric acid, alkali permanganate, etc. Only recently a process of contacting a picoline with a solid oxidation catalyst together with molecular oxygen, normally referred to as air oxidation process, was proposed. However the yields of pyridinecarboxylic acid in such air oxidation process are very low.

For example, vapor phase contacting of β or γ picoline with a fluidized bed of tin vanadate- or vanadium oxide-chromium oxide-pumice system, together with air, to produce the corresponding pyridinecarboxylic acids, is disclosed in Indian Journal of Applied Chemistry, 30, 35–47 (1967). However, in that process the nicotinic acid yield is at most 24.4 wt. percent and the isonicotinic acid yield is at most 29.3 wt. percent. Thus the process is still unsatisfactory in respect of the object products' yields. Furthermore, the pyridinecarboxylic acids obtained through such a process show unsatisfactory purity.

Also Japanese Official Patent Gazette, Publication No. 27,218/1968 discloses a process for preparing cyanopyridines with relatively high yield, by so-called ammoxidation, in which alkylpyridines are contacted with a solid oxidation catalyst in the presence of ammonia and air. Pyridinecarboxylic acids can be obtained upon hydrolysis of the thus obtained cyanopyridines. However, such preparation of pyridinecarboxylic acid requires a two-stage reaction, and furthermore requires such additional materials as ammonia and hydrolyzing agent. Therefore the process is industrially disadvantageous for the purpose of preparing carboxylic acids.

We discovered that, when the picolines are contacted with a solid oxidation catalyst containing a vanadium compound bonded with oxygen in the presence of a molecular oxygen-containing gas alone, to be vapor phase oxidized, the resulting pyridinecarboxylic acid yield is extremely low due to decomposition of pyridine rings, and furthermore the product is contaminated with the decomposition product, polymerized product, and other impurities. Consequently the product exhibits objectionable color and odor, and its purification is very difficult. We now discovered that when the picolines are contacted with a solid oxidation catalyst, together with a molecular oxygen-containing gas and a specific amount of steam, the object pyridinecarboxylic acids are obtained at remarkably high yields, with relatively high purities.

Thus, in accordance with the present invention, a process for the preparation of pyridinecarboxylic acids has been developed, in which a compound of the formula

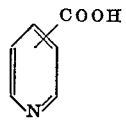 (II)

in which the carboxyl group is linked at the 3- or 4-position on the pyridine ring, is prepared by contacting a starting compound of the formula

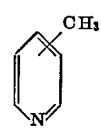 (I)

in which the methyl group is linked at the 3- or 4-position on the pyridine ring and a molecular oxygen-containing gas with a solid oxidation catalyst containing a vanadium compound bonded with oxygen, at vapor phase, the characteristic feature residing introducing steam into the reaction system in an amount of at least 30 times by weight of the starting compound.

In the present invention, β-picoline or γ-picoline as indicated by the foregoing General Formula I is used as the starting compound. Those starting compounds can be supplied to the reaction system as gasified by heating to a temperature above the level at which the compounds are substantially volatilized, or by dissolving the compounds in water and adding the aqueous solution to heated molecular oxygen-containing gas.

An important feature of the invention resides in the supplying of at least 30 times by weight of the employed picoline of steam to the system, during the contact of a picoline and a molecular oxygen-containing gas with a solid oxidation catalyst which contains a vanadium compound bonded with oxygen.

The isonicotinic acid yields obtained when γ-picoline was supplied onto the solid oxidation catalyst as described in later given Example 1 below, at a concentration of 25 g./Nm.³ of air and at the reaction temperature of 350° C., with the amount of steam per the γ-picoline varied in each run, are shown in Table 1 below.

TABLE 1

| Amount of steam (g./g. of γ-picoline/hr.): | Isonicotinic acid yield (percent) |
|---|---|
| 0 | 21.5 |
| 24.8 | 40.0 |
| 50.2 | 61.5 |
| 61.0 | 80.0 |
| 96.5 | 92.0 |
| 146.7 | 98.6 |
| 191.2 | 102.0 |
| 235.1 | 101.8 |
| 289.7 | 98.6 |
| 332.6 | 92.5 |

From the data in Table 1 above, it is apparent that by the introduction of at least 30 times by weight of the γ-picoline of steam into the reaction system, the isonicotinic acid yield can be more than approximately doubled, compared with the case wherein no steam is used. Normally pyridinecarboxylic acid yield increases to a certain level, with the increase in the amount of steam per unit amount of starting picoline. In consideration of the yield curve, it is particularly preferred in this invention to employ at least 70 weight times the starting picoline of steam. Whereas, use of more than 300 weight times the starting picoline of steam is ineffective for further improving the pyridinecarboxylic acid yield. Also use of excessive amount of steam is objectionable both from the standpoints of thermal economy and scale of reaction apparatus. Thus the particularly preferred amount of steam ranges from about 70–300 weight times the starting picoline.

The reason why the yield and selectivity of pyridinecarboxylic acid are conspicuously improved and also the product's purity is improved by the concurrent presence of steam in accordance with the invention is not yet fully clear. However, we presume that the above effect of steam is produced probably by its acceleration of product's release from the catalyst surface, occurring in the rate determining step. That is, while the picoline is oxidized by the oxygen adsorbed on the catalyst surface to be converted to pyridinecarboxylic acid, the acid cannot leave the catalyst surface due to the low vapor pressure and hydrogen bond. Steam is presumed to have an effect of facilitating the release of the product from the catalyst surface. Therefore, the use of steam in this invention is clearly distinguishable from the use of carbon dioxide or nitrogen gas simply as an inert diluent gas.

Any known solid oxidation catalyst is usable in the invention, so far as it contains a vanadium compound bonded with oxygen. As such catalysts, the following may be named by way of example; vanadium oxide catalyst, combined catalysts of vanadium oxide with oxide of antimony, chromium, tin, or germanium; catalysts formed of antimony, chromium, tin, and germanium salt of vanadic acid, etc. Those catalysts may contain minor amount of a promoter. They can be used either by themselves, or as supported on solid carriers conventionally employed with solid oxidation catalysts in vapor phase reaction.

We have discovered that a catalyst obtained by calcining a mixture of (a) vanadium oxide or a vanadium compound which is converted to vanadium oxide under calcining temperature, and (b) chromium oxide or a chromium compound which is converted to chromium oxide at the calcining temperature, at temperatures not lower than 560° C., and in which the atomic ratio of V:Cr ranges from about 1:0.5–1:1, particularly 1:0.6–1:0.75, is indeed excellent as the solid oxidation catalyst for the catalytic oxidation of picolines in the presence of steam.

The vanadium component in the catalyst may be present in the form of the oxides of various valency states of vanadium. However, it is preferred in this invention that the vanadium component be in pentavalent state.

The starting material of the vanadium component may be an oxide such as $V_2O_5$, but vanadium compounds which are convertible to vanadium oxide at the calcining temperature, such as ammonium metavanadate, vanadyl sulfate, vanadium hydroxide, or vanadyl of carboxylic acid such as formic acid, oxalic acid, etc. are preferred. The optimum vanadium compound for the catalyst preparation is ammonium metavanadate.

The chromium component of the catalyst is preferably a trivalent chromium oxide, or a compound which is convertible to a trivalent chromium oxide during the calcination. If a hexavalent chromium oxide or a chromium compound which is convertible to $CrO_3$ during the calcination is used as the chromium component, the yield of pyridinecarboxylic acid tends to be lowered, compared with the use of a trivalent chromium oxide component. The preferred source of the chromium component is chromium compounds which are convertible to $Cr_2O_3$ at the calcination temperature, such as ammonium (III) chromate, chromium (III) nitrate, chromium (III) sulfate, chromium (III) hydroxide, chromium (III) ammonium alum, etc., among which the water-soluble compounds are particularly preferred.

It is preferred that the atomic ratio of the vanadium component to chromium component in the catalyst, as V:Cr, should be within the range of from about 1:0.5–1:1. When the ratio of chromium component is less than the above-specified range, the catalyst becomes glassy, and consequently the reaction rate is decreased, conversion of the starting picoline is lowered, and amount of side product is increased. In that case, satisfactory results as to the yield and purity of the object pyridinecarboxylic acid and thermal stability of the catalyst can never be expected.

Whereas, when the chromium content of the catalyst exceeds the above-specified range, the catalyst's coherence is impaired, and furthermore the conversion of starting picoline to $CO_2$ increases to reduce the pyridinecarboxylic acid yield.

In the catalyst of the invention, the optimum atomic ratio of V:Cr ranges from about 1:0.6–1:0.75.

Besides the foregoing vanadium and chromium component, a specific metallic component may be added to the catalyst employed in the invention, as a promoter. Such a promoter is selected from the group consisting of tin plus antimony, germanium, tin plus indium, niobium, tantalum, gallium and zirconium. Those metallic components useful as the promoter are added to the vanadium and chromium components, in the form of oxide, or as the compounds which are convertible to the corresponding oxides at the calcination temperature. As the compounds other than oxide, nitrate, halide, ammonium salt, hydroxide, and organic acid salts such as of formic acid, oxalic acid, etc. can be used. Among the foregoing, water-soluble, promoter metal component is preferred. Particularly preferred promoter metal components are, tin plus antimony, germanium, tin plus indium in that order. The combination of tin plus antimony contributes to provide a high yield of pyridinecarboxylic acid of high purity. Also, germanium exhibits a conspicuous improving effect on pyridinecarboxylic acid yield. When the combination of tin plus antimony is employed, the preferred atomic ratio of Sn:Sb ranges from about 1:0.1–1:0.6. When the combination of tin plus indium is employed, the preferred atomic ratio of Sn:In ranges from about 1:0.1–1:0.6. Obviously, those promoter metal components can be used each by itself or in combination.

The promoter metal component is normally added to the system in an amount of from about 0.5–20% to the vanadium and chromium components, the percentage being of from about atomic ratio, preferably in an amount of 1–15%. When the amount of the promoter is less than the lowest limit in the above-specified range, appreciable yield improvement due to its addition cannot be expected. Whereas, if it is more than the upper limit set forth in the above, thermal stability of the catalyst is impaired.

In accordance with the present invention, the mixture of the above vanadium and chromium components, or the mixture further containing the promoter metal component, is calcined at 560° C. or above, preferably at temperatures ranging from 560° to 850° C. A simple mixture of vanadium oxide and chromium oxide, or that of the two oxides with an oxide of the promoter metal component, never exhibits the activity manifested by the above-specified catalyst of the invention. In view of the fact that at temperatures above 560° C., $V_2O_5$ and $Cr_2O_3$ react to form $CrVO_4$, presumably at least a part of the catalyst is present in the form of $CrVO_4$. Preferably, the promoter metal component should be added to the vanandium and chromium components prior to their calcination. If the addition of the promoter metal component is effected after calcination of the mixture of vanadium and chromium component, conspicuous increase in pyridinecarboxylic acid yield cannot be expected. That the specified catalyst is different from mere mixtures of calcined product of vanadium and chromium components with an oxide of the promoter metal component is obvious, since the catalyst shows quite different color from that of simple mixtures.

The specified catalysts can be used by themselves without carriers, as shaped into particles of optional form, but normally it is preferred to use them as supported on refractory materials conventionally employed as the carriers of solid oxidation catalysts. As the carriers, refractory materials of specific surface areas of not more than 2 m.$^2$/g. are suitably employed. For example, molten silica, molten alumina, silicon carbide, pumice, porcelain, silicate, etc. can be advantageously used.

The catalysts can be bound to the carriers by the means known per se. For example, suitable compounds which are soluble in water or dilute acid are selected as the vanadium and chromium components, or furthermore, as the promoter metal component, and they are dissolved in water or a dilute acid in such ratio as will provide the atomic ratio within the specified ranges. Upon impregnating the carrier with the resulting solution and calcining the system at temperatures not lower than 560° C., the catalyst as supported on the carrier can be obtained. In a preferred embodiment for preparing the above catalysts useful for the subject process, silica sol is added to the aqueous or dilute acid solution containing the catalyst components. Such addition of silica sol is effective for promoting the adhesion of catalyst components to the carrier, and for further improving the catalytic activity and thermal stability of the catalyst. It is particularly advantageous to use silica sol at an amount ranging from about 5 to 50 wt. percent to the total catalyst components calculated as oxides.

The specified catalysts can be used in optional particle size. The optimum particle diameter varies somewhat, depending on the type of bed employed for the reaction, which may be fluidized or fixed. Normally the diameter can be suitably selected from the range of from about 0.05–10 mm.

The vapor phase oxidation of picolines in accordance with the invention is accomplished by contacting the vapor of the above-specified picolines with the above-described catalyst, together with steam and molecular oxygen. The preferred reaction temperature ranges from about 320–600° C., and preferably, 320–450° C.

As the molecular oxygen, for example, oxygen diluted in inert gases such as $N_2$, $CO_2$, etc., or air, can be used. The preferred amount of molecular oxygen is 10–200 molar times the starting picoline, particularly 30–100 molar times. When γ-picoline is selected as the starting material, use of air as the molecular oxygen is economically advantageous, since isonicotinic acid can be obtained at extremely high yields. Also when β-picoline is used, the oxygen concentration in the oxygen-containing gas should preferably be at least 60 mol percent, use of pure oxygen gas being particularly preferred.

The reaction pressure is not critical. It is permissible to employ slightly reduced pressure or elevated pressure in the order of 2 kg./cm.$^2$ gauge, but normally atmospheric pressure is quite satisfactory. The contact time of the starting picolines with the catalyst differs somewhat depending on the reaction temperature employed, while normally that of 0.01–0.5 seconds is sufficient.

The reaction can be performed in the manner of gas-solid catalytic reaction known per se, in which the catalyst is used as a fixed bed, movable bed or fluidized layer. Since at least 30 weight times the starting picoline of steam is employed in the subject process, there is obtained another advantage that, even when a fixed bed-type reactor in which hot spot is apt to be formed is employed, reduction in catalytic activity is negligible .

The pyridinecarboxylic acids obtained in accordance with the subject process can be recovered from the reaction system by means well known in the art. For example, the gas discharged from the reactor is cooled to a temperature below the condensation point of water with an optional coolant, to recover the pyridinecarboxylic acid as an aqueous solution. Or, it can be cooled to a temperature higher than the condensation point of water but below the condensation point of pyridinecarboxylic acid, to recover the acid as a liquid or solid.

Thus, in accordance with the present invention, isonicotinic acid can be obtained from γ-picoline at yields as high as 90–125% by weight (approximately 68–94.5 mol percent), and nicotinic acid from β-picoline, at yields of, for example, 85–105% by weight (approximately 64.2–79.3 mol percent). Furthermore, the products thus prepared on industrial scales have very high purity such as even 98%.

The invention will be hereinafter explained with reference to the following working example, which are merely illustrative of the present invention.

EXAMPLE 1

(A) Preparation of catalyst

Silicon carbide of 1.2 m.$^2$/g. in specific surface area, and 2.0 mm. in average particle diameter, was used as the carrier. Twenty-five (25) g. of ammonium metavanadate and 25 g. of ammonium chromate (0.75 gram atom of Cr per 1 gram atom of V) were dissolved in 1 liter of water. Then 0.8 g. of antimony oxide ($Sb_2O_3$) separately dissolved in minor amount of hydrochloric acid (1.5% to V+Cr, the percentage being of atomic ratio) and 4 g. of stannic chloride ($SnCl_4 \cdot 3.5\ H_2O$, 6.6% to V+Cr, the percentage being of atomic ratio) were added to the above aqueous solution with thorough stirring, to form a suspension.

The suspension was poured onto 100 ml. of the silicon carbide carrier, and the resulting impregnation product was pre-sintered at 400–450° C., followed by two hours calcination at 700° C. Thus a catalyst was prepared.

(B) Synthesis of isonicotinic acid

Forty (40) ml. of the catalyst was packed in a U-shaped glass tube, and the tube was immersed in a molten salt bath. While the bath temperature was maintained at 350° C., γ-picoline at a concentration of 25.0 g./Nm.$^3$ of air was passed through the reactor tube for 3 hours continuously, while the amount of water used was 195 ml./g. of γ-picoline/hr., and air of 200 l./hr. was supplied to the reactor.

The air was divided into two portions, the first portion being passed through the water evaporator, and the other, passed through the evaporator of γ-picoline. The two portions were combined at the mixer, and fed into the reactor via the pre-heater. The discharged vapor from the reactor was passed through an air-cooler and then cooled with water, to be finally collected in a receiver at the bottom, together with water. The uncondensed gas was further washed with water and discharged into air, through a gas analyzer. All the crystalline product and water collected at the air-cooler and water-cooler were washed out, evaporated to dryness, and collected to be analyzed. The solid product recovered from the washings of uncondensed gas was analyzed, but not added to the yield.

Under the above-described conditions, 106.0 wt. percent of crude isonicotinic acid (96.1% in purity) was obtained.

EXAMPLE 2

A catalyst was prepared similarly to Example 1-A, except that molten alumina of 1.1 m.²/g. in specific surface area and 2.0-2.3 mm. in average particle diameter was used as the carrier.

Forty (40) ml. of the catalyst was packed in a U-shaped glass tube, and the vapor phase oxidation of γ-picoline was conducted similarly to Example 1-B, through the reactor tube, except that the salt bath temperature was raised to 370° C., γ-picoline concentration was 20.0 g./Nm.³ of air, the amount of water was 100 ml./g. of γ-picoline/hr., and the air used was 210 l./hr. After 3 hours' reaction, crude isonicotinic acid of 95.2% in purity was obtained with a yield of 98.3 wt. percent.

EXAMPLE 3

The reaction as described in Example 1-B was repeated using the catalyst prepared as in Example 1-A, except that the amount of water supply to the reaction system was varied in each run. The results were as in already given in Table 1.

EXAMPLE 4

The following five types of catalysts were prepared, using silicon carbide of 1.1 m.²/g. in specific surface area, and 2.1 mm. in average particle diameter, as the carrier.

Catalyst (I)

Twenty-five (25) g. of ammonium metavanadate was dissolved in 1 liter of water, and the solution was poured onto 100 ml. of the above-specified carrier. The resulting impregnation product was thermally decomposed at 450° C.

Catalyst (II)

The above catalyst (I) was heated at 750° C. for 2 hours and molten.

Catalyst (III)

Twenty (20) g. of ammonium metavanadate and 20 g. of ammonium chromate (0.75 gram atom of Cr per 1 gram atom of V) were dissolved in 1 liter of water, and poured onto 100 ml. of the carrier. The resulting impregnation product was heated at 750° C. for 2 hours and molten.

Catalyst (IV)

Twenty (20) g. of ammonium metavanadate and 16 g. of ammonium chromate (0.6 gram atom of Cr per 1 gram atom of V) were dissolved in 1 liter of water. Separately, 0.8 g. (1.25% to V+Cr, the percentage being of atomic ratio) of germanium oxide was dissolved in a minor amount of diluted aqueous ammonia, and added to the first aqueous solution. Furthermore, 25 g. of 30% concentration silica sol solution (approximately 20 wt. percent to the total of $V_2O_5$, $Cr_2O_3$ and $GeO_2$) was added to the solution for improving the adhesion of catalyst components to the carrier. The solution was then poured onto 100 ml. of the carrier. Thus impregnated carrier was presintered at 400-450° C., and then calcined at 750° C. to be molten.

Catalyst (V)

The catalyst obtained as Example 1-A was used.

The reaction of Example 1-B was effected using the foregoing five catalysts under the conditions given in Table 2 below, to produce isonicotinic acid. The results are also given in Table 2 in which the run number corresponds to the catalyst number.

TABLE 2

| Run No. | Bath temp. (° C.) | Amount of water (g./g./hr.) | Space velocity (l./hr.) | Isonicotinic acid yield wt.(percent) |
| --- | --- | --- | --- | --- |
| 1 | 400 | 130 | 10.475 | 55.6 |
| 2 | 450 | 114 | 9.700 | 59.2 |
| 3 | 380 | 119 | 8.750 | 86.1 |
| 4 | 380 | 119 | 10.000 | 93.0 |
| 5 | 350 | 140 | 8.300 | 125.7 |

NOTE.—Space velocity is calculated inclusive of steam.

The results in the above Table 2 clearly demonstrate that by maintaining the atomic ratio of V:Cr in the catalyst within the range of 1:0.5-1:1 and calcining the mixture of $V_2O_5$ and $Cr_2O_3$ at temperatures not lower than 560° C., pyridinecarboxylic acid yield is conspicuously improved; and that by the addition of tin oxide plus antimony oxide, or germanium oxide, to the catalyst system, the catalytic activity is even more improved.

EXAMPLE 5

Catalysts were prepared as in Example 1-A, except that $Sb_2O_3$ and $SnCl_4 \cdot 3.5H_2O$ were replaced by the below-specified components in each run.

| Component | Atomic ratio in percent, to V + Cr |
| --- | --- |
| (a) {InCl₃ | 1 |
| {SnCl₄·3,5 H₂O | 4 |
| (b) NbCl₅ | 1 |
| (c) TaCl₅ | 1 |
| (d) Ga₂O₃ | 2.5 |
| (e) ZrCl₄ | 10.0 |

Using the above catalysts, the reaction of Run No. 3 in Example 4 was repeated. Whereby the isonicotinic acid yield was increased by 3-5 wt. percent, compared with the use of oxidation catalyst containing none of the promoter metal component (Catalyst III of Example 4).

EXAMPLE 6

Forty (40) cc. of the catalyst obtained in Example 1-A was packed in a U-shaped glass tube reactor of 18mm. in inner diameter. The reactor was immersed in a molten nitrate bath, and the bath temperature was controlled to 370° C.±5° C. To the reactor β-picoline was supplied at the concentration of 25.0 g./Nm.³ of oxygen, while the amount of water poured was 133 cc./g. of β-picoline/hr. and that of oxygen was 200 l./hr. Thus the reaction was continued for 3 hours.

The oxygen was divided into two portions, the first portion being passed through the water evaporator to carry steam, and the other, through β-picoline evaporator to carry β-picoline vapor. The two portions were combined at the mixer, passed through a pre-heater, and then supplied to the U-shaped glass tube reactor. The vapor leaving the reactor was passed through an air-cooler and water-cooler to be condensed with water. The uncondensed gas was further passed through an aqueous washer and gas analyzer, and discharged into air. All the crystals and water collected at the air-cooler and water-cooler were washed out, evaporated to dryness, and analyzed. The product collected at the aqueous washer also was analyzed, but not added to the yield.

Under the above conditions, 98.3 wt. percent of nicotinic acid of 97.4% in purity was obtained.

EXAMPLE 7

Example 6 was repeated except that no water was supplied to the reaction system. Thus 28.9 wt. percent of crude nicotinic acid of 90.0% in purity was obtained.

EXAMPLE 8

The catalyst and reactor of Example 6 were employed. The bath temperature was adjusted to 390° C.±5° C., β-picoline concentration was 25.0 g./Nm.³ of air, amount of water was 101.4 cc./g. of β-picoline/hr., and the air supply was 200 1./hr. After 3 hours' reaction, 80.3 wt. percent of crude nicotinic acid of 99.0% in purity was obtained.

EXAMPLE 9

The catalyst and reactor of Example 6 were employed. The bath temperature was 370° C.±5° C.; β-picoline concentration was 20.0 g./Nm.³ of oxygen-containing gas; the amount of water was approximately 130 cc./g. of β-picoline; and the amount of molecular oxygen-containing gas was 200 1. per hour, in which the ratio of air to oxygen was varied in each run. The reaction results were as follows:

| Air (l./hr.) | Oxygen (l./hr.) | Nicotinic acid yield (as 100% purity, wt. percent) |
|---|---|---|
| 200 | 0 | 64.8 |
| 170 | 30 | 62.7 |
| 150 | 50 | 63.9 |
| 100 | 100 | 70.3 |
| 70 | 130 | 78.8 |
| 0 | 200 | 99.7 |

What is claimed is:
1. In a process for the preparation of a compound of the formula

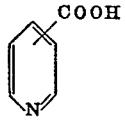

in which the carboxyl group is linked at the 3- or 4-position on the pyridine ring, which consists essentially of contacting a compound of the formula

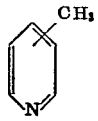

in which the methyl group is linked at the 3- or 4-position on the pyridine ring, with a solid oxidation catalyst and with a molecular oxygen-containing gas selected from oxygen gas, oxygen gas diluted with an inert gas and air, in the vapor phase, at a temperature within the range of 320 to 450° C., the improvement wherein said solid oxidation catalyst is a catalyst prepared by calcining a mixture of (a) vanadium oxide, (b) chromium oxide and (c) an oxide of a promoter metal component selected from tin plus antimony, germanium, tin plus indium, niobium, tantalum, gallium and zirconium, at a temperature not lower than 560° C., the atomic ratio of vanadium to chromium in the mixture being within the range of 1:0.5 to 1:1, said oxide of a promoter metal component in said solid oxidation catalyst being present in an amount of 0.5 to 20% based on the total of the vanadium and chromium metals, the percentage being of atomic ratio and said molecular oxygen-containing gas being employed in an amount such that the molecular oxygen is in the range of about 10 to 200 molar times that of the starting compound, and steam is introduced into the reaction system in an amount of 70 to 300 times by weight of the weight of said

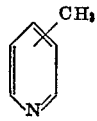

References Cited
UNITED STATES PATENTS
2,845,428   7/1958   Wettstein _____ 260—295

OTHER REFERENCES
Chem. Abstracts, vol. 68, No. 5, item Nos. 21,801f and 21,807n, Jan. 29, 1968.
Bhan et al.: Chem. Abstracts, vol. 64, No. 9, item No. 12,638-c-e, Apr. 25, 1966.
Roy et al.: Chem. Abstracts, vol. 55, No. 17, i6,967a, Aug. 21, 1961.

ALAN L. ROTMAN, Primary Examiner

U.S. Cl. X.R.
260—295.5 R; 252—464, 469